Patented May 17, 1932

1,859,212

UNITED STATES PATENT OFFICE

BERTRAM MAYER, HUGO SIEBENBÜRGER, AND KARL KRAUER, OF BASEL, SWITZERLAND, ASSIGNORS TO SOCIETY OF CHEMICAL INDUSTRY IN BASLE, OF BASEL, SWITZERLAND

VAT-DYESTUFF OF THE DIBENZANTHRONE SERIES AND PROCESS OF MAKING SAME

No Drawing. Application filed September 12, 1929, Serial No. 392,256, and in Switzerland September 21, 1928.

This invention relates to the manufacture of new vat dyestuffs by treating $Bz_1:Bz_1'$-dibenzanthronyl with a nitrating agent and fusing the product thus obtained with a caustic alkali. The products of the manufacture are dyestuffs which dye blue grey. The dyeings on cotton may be distinguished by remarkable properties of fastness. The same products are obtained if previous to the melting operation, the nitrated $Bz_1:Bz_1'$-dibenzanthronyl is reduced. By suitable treatment, such as halogenation, nitration, oxidation followed by alkylation, the new dyestuffs can be converted into further valuable products. All these new dyestuffs may be used as such or in the form of their leuco-ester salts.

Neither the position where the nitro-group enters the $Bz_1:Bz_1'$-dibenzanthronyl molecule, nor the constitution of the vat-dyestuffs obtained therefrom is known.

The following examples illustrate the invention, the parts being by weight:—

Example 1

45.8 parts of $Bz_1:Bz_1'$-dibenzanthronyl of the formula

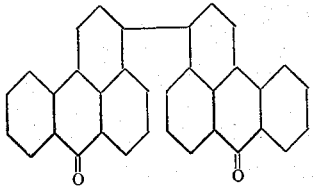

are introduced at 10–20° C. into 920 parts of sulphuric acid monohydrate, and the whole is stirred until dissolution is complete. In the course of ½ hour there are dropped into this solution at 10–20° C. 13 parts of a mixture of equal parts of anhydrous sulphuric acid and nitric acid and the whole is then kept at the same temperature for 2 hours longer. While the mixed acids are being dropped into the liquid there occurs a change of colour from eosine red to brown red. The mass is poured on to ice and the precipitated brown yellow nitro-body, probably nitro-$Bz_1:Bz_1'$-dibenzanthronyl is isolated by filtration in the usual manner. It dissolves in concentrated sulphuric acid to an eosine red solution. In distinction from the parent material which shows an intensely yellow-red fluorescence, the new body has only a feeble brownish fluorescence in concentrated sulphuric acid. It is very sparingly soluble in boiling glacial acetic acid and in toluene. From hot nitrobenzene it can be recrystallized.

Example 2

A mixture of 300 parts of caustic potash and 150 parts of alcohol is heated with partial distillation of the alcohol to 160° C. and into the clear melt there are introduced at 160–170° C. in the course of ¼ to ½ hour, 30 parts of the nitro-$Bz_1:Bz_1'$-dibenzanthronyl obtained as described in Example 1. From the beginning of the introduction the melt becomes intensely blue while foaming slightly (due to the evolution of ammonia). When the introduction is complete the whole is heated further to 225° C. and then kept for 1 hour at 225–230° C. The final grey melt is cooled and dissolved in water, the new dyestuff being separated from the solution by means of a current of air.

The new dyestuff containing a small amount of nitrogen is a dark powder, soluble in concentrated sulphuric acid to a dull blue-violet solution, from which when it is poured into water, the dyestuff separates in violet-blue flocks. In boiling toluene the dyestuff dissolves sparingly to a solution which is pale blue and has a brown red fluorescence, in hot nitrobenzene it dissolves to a greenish-blue solution having a feeble brown fluorescence and in boiling aniline it dissolves to a blue solution. Its vat is bright blue-violet having a blue grey bloom. Cotton dyed in it is dyed very fast blue grey after exposure to air and soaping.

The new product is distinguished from the dyestuff of U. S. patent specification No. 1,538,419 obtained from 2:2'-dibenzanthronyl by a remarkable productiveness, a better fastness to keir-boiling of its dyeings, and an essentially more valuable bluer shade of its dyeings.

Example 3

5 parts of the vat dyestuff made as described in Example 2 are suspended in 50 parts of nitrobenzene and into the mixture is dropped at the ordinary temperature in the course of ½ hour and occasionally cooling a mixture of 3.5 parts of nitric acid of 99–100 per cent. strength and 25 parts of nitrobenzene. In the course of ½ hour the whole is heated to 50° C. and kept for 6 hours at 50–55° C. At the end of this period the liquid is mixed with a little water and 5 parts of sodium carbonate and subjected to distillation by steam, the new dyestuff being finally isolated as is usual. The dyestuff is a dark powder which dissolves in concentrated sulphuric acid to a dull blue solution, from which, when it is poured into water, the dyestuff is precipitated in the form of reddish blue flocks. In boiling toluene the dyestuff dissolves to a violet blue solution with a very feeble brown fluorescence, in hot nitrobenzene to a blue solution having a feeble brown fluorescence and in aniline to a blue solution. In its blue vat cotton is dyed, after exposure to air, blackish green shades, which by oxidation on the fibre, for example with Javell's liquor, become deep black.

By halogenation the product of Example 2 is converted into a dyestuff which dies blue and by oxidation and alkylation into a dyestuff which dyes green.

What we claim is:—

1. As a step in the preparation of a new vat dyestuff, the treatment of the $Bz_1:Bz_1'$-dibenzanthronyl dissolved in sulphuric acid with an equivalent of nitric acid to produce a mono-nitrated $Bz_1:Bz_1'$-dibenzanthronyl.

2. As a step in the preparation of a new vat dyestuff, the heating of the mono-nitrated $Bz_1:Bz_1'$-dibenzanthronyl with fused caustic alcoholic potash.

3. The preparation of a new vat dyestuff, consisting in treating the $Bz_1:Bz_1'$-dibenzanthronyl dissolved in sulphuric acid with an equivalent of nitric acid to produce a mono-nitrated $Bz_1:Bz_1'$-dibenzanthronyl, and then treating the mono-nitrated $Bz_1:Bz_1'$-dibenzanthronyl with fused caustic alcoholic potash.

4. The herein described new vat dyestuff obtainable according to claim 3, which forms a dark powder, containing a small amount of nitrogen, soluble in concentrated sulphuric acid to a dull blue-violet solution, from which when it is poured into water, the dyestuff separates in violet-blue flocks, sparingly soluble in boiling toluene to a solution which is pale blue and has a brown red fluorescence, dissolving in hot nitrobenzene to a greenish-blue solution having a feeble brown fluorescence and in boiling aniline to a blue solution, giving a bright blue-violet vat with a blue-grey bloom, and dyeing cotton fast blue-grey tints which are very fast and strong.

In witness whereof we have hereunto signed our names this 3d day of September, 1929.

BERTRAM MAYER.
HUGO SIEBENBÜRGER.
KARL KRAUER.